United States Patent

[11] 3,618,015

[72] Inventor Henry Peter Homonick
 Ottawa, Ontario, Canada
[21] Appl. No. 51,256
[22] Filed June 30, 1970
[45] Patented Nov. 2, 1971
[73] Assignee GTE Automatic Electric Laboratories
 Incorporated
 Northlake, Ill.

[54] APPARATUS FOR DISCRIMINATING BETWEEN ERRORS AND FAULTS
20 Claims, 9 Drawing Figs.
[52] U.S. Cl. ................................................. 340/146.1,
 179/175.2 R
[51] Int. Cl. ............................................. G08c 25/00,
 H04m 3/08
[50] Field of Search ........................................ 340/146.1,
 172.5; 179/175.2 R

[56] References Cited
UNITED STATES PATENTS
3,060,273 10/1962 Nowak et al. ................. 340/146.1 X
3,409,877 11/1968 Alterman et al. .............. 340/172.5
3,435,159 3/1969 Brooks et al. ................. 179/175.2
3,492,445 1/1970 Lecoanet ...................... 179/175.2
3,509,532 4/1970 Vande Wege ................. 340/146.1

Primary Examiner—Charles E. Atkinson
Attorneys—Cyril A. Krenzer, K. Mullerheim and B. E. Franz ABSTRACT: Signal points of duplicated subsystems are compared, to produce a mismatch if they differ. Since mismatches due to errors caused by noise, etc. occur infrequently and at random, and are of short duration, relative to mismatches caused by actual faults; apparatus to discriminate between them comprises a high frequency of occurrence of mismatches unit, and an extended mismatch unit. The high frequency of occurrence unit includes a counter and timer to detect whether a given number of mismatches occur within a given time. The extended mismatch unit may comprise a capacitor connected to standard logic devices to charge during a mismatch via resistance within the logic devices, and to be short-circuited via a transistor in a logic device at other times.

INVENTOR
PETER HENRY HOMONICK

BY
Bernard E. Franz
ATTORNEY

APPARATUS FOR DISCRIMINATING BETWEEN ERRORS AND FAULTS

BACKGROUND OF THE INVENTION

1. Field of the Invention

This invention relates to apparatus for discriminating between errors and faults; and more particularly to apparatus for use in a system in which two digital subsystems have corresponding points compared, producing a mismatch signal when there is a difference between the subsystems. The mismatches may be produced by either errors (such as caused by induced noise) or by actual faults in one of the subsystems.

2. Description of the Prior Art

In order to increase the reliability of systems made up of relatively unreliable components, redundancy techniques are often used. For example, in a digital computer system the central processor might be duplicated if it were determined that this subsystem contributed significantly in reducing the probability of achieving a highly reliable system. A fault in one subsystem may be overcome by switching the load to the duplicate unit. Thus, the system continues operating despite a failure in one of its subsystems.

It is necessary to provide an arrangement for determining the presence of a fault. A common expedient is to have the duplicate subsystems operating in synchronism; with only one of them actually in control of the system (on line). Comparison may be made between the duplicated subsystems at strategic points such as read, write and address busses, and at the output of important registers such as accumulators. On detection of a mismatch, a separate subsystem is provided which requests that a series of tests be performed on the subsystem which caused the mismatch. This "test control" subsystem controls the placing of these tests and monitors their progress. The tests may be quite extensive. They not only are performed within the suspected subsystem, but the test control in it may also request that the subsystem provide inputs to related peripheral subsystems and even the controlled process itself. For example, the central processor may be instructed to provide a particular control of the controlled peripheral apparatus. The results may then be observed.

A serious problem occurs in a computer providing real time control and in a relatively noisy environment. A computer controlled telephone switching system is a particular example. Noise may cause numerous mismatches and the resulting request for tests to be carried out. Since these fault detection tests are extensive and of a higher priority they may absorb a significant amount of the real-time capacity of the system, thus loading it to degradation in system operation.

An object of the invention is to provide apparatus to discriminate between mismatches caused by errors etc. and those caused by actual faults.

It is known to provide apparatus to assure that the number of errors which have occurred in a fixed unit of time have not exceeded a certain maximum number, to assure that the system is not overly burdened by large numbers of single errors which probably indicate a system trouble. See, for example, U.S. Pat. No. 3,408,628 by R. L. Brass et al. at column 24, line 7 et seq.

SUMMARY OF THE INVENTION

This invention provides apparatus which is analogous to a "-filter" to discriminate between those mismatches caused by errors due to noise etc. and those mismatches caused by actual faults. It may be argued that noise mismatches will occur randomly, and moreover, will not remain for a long period nor occur with high frequency. Actual faults will result in a somewhat different mismatch characteristic in that they will either occur with a high frequency or have a long duration.

According to the invention the mismatch signals received from the output of the circuits which compare the duplicated subsystems is supplied to two units, one of which measures the frequency of occurrence of the mismatches and the other which measures the duration of any single mismatch, with a true output from either unit indicating a probable fault.

The frequency of mismatch determining unit may comprise a counter and a timer arranged to count the number of mismatches occurring in a given period of time. The extended mismatch determining unit may comprise any suitable timing arrangement which is started at the beginning of a mismatch and produces an output signal after a given time has elapsed. A preferred embodiment of such a timing arrangement uses a capacitor connected between the output of a bistable storage device which is set at a beginning of a mismatch and reset when the mismatch is no longer present, with the condenser charging from a fixed resistance when the storage device is in the set condition, and being rapidly discharged whenever it is in the reset condition.

DETAILED DESCRIPTION

Figure 1:
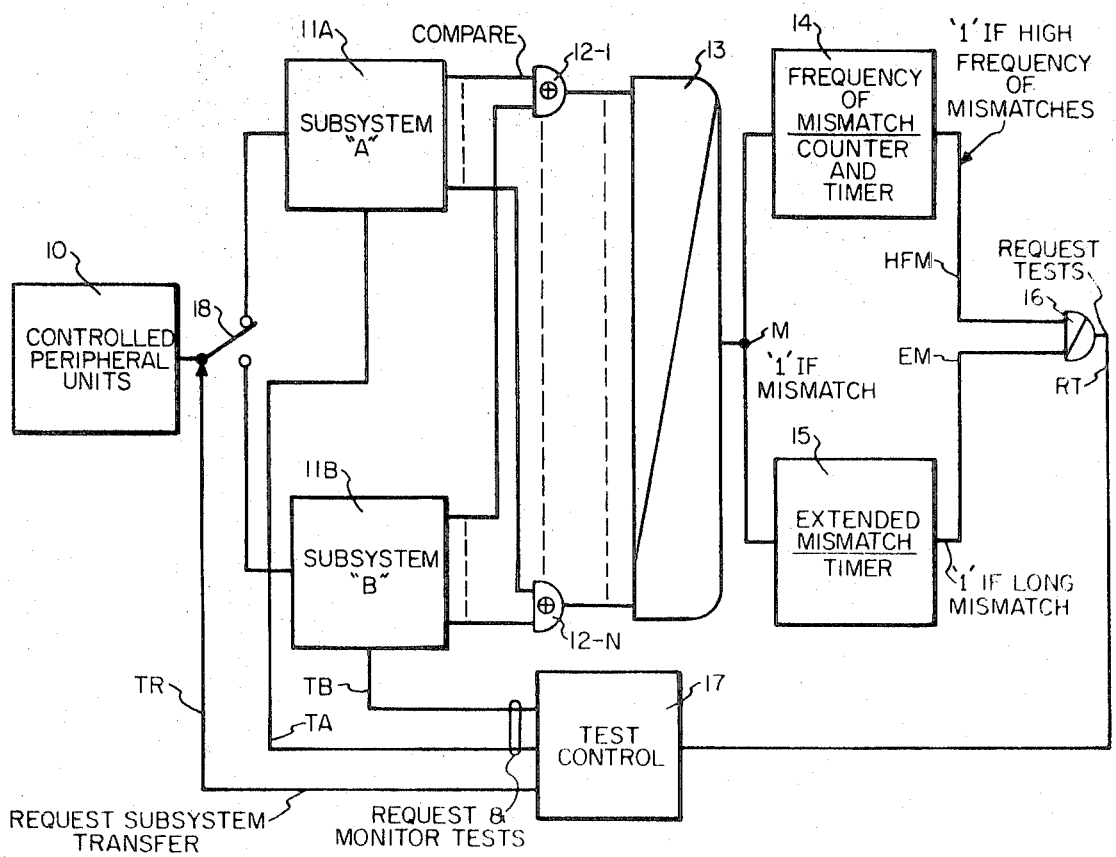
FIG. 1 is a functional block diagram of a general embodiment of the invention.

In FIG. 1 a digital central processing system is shown as comprising redundant subsystems 11A and 11B. One of these subsystems is normally on line to control peripheral units 10 via transfer switching apparatus represented symbolically by switch 18. To detect errors and faults certain points of the two subsystems are compared by circuitry which may, for example, comprise EXCLUSIVE OR gates 12-1 to 12-N inclusive; with the outputs of these gates combined via and OR gate 13. If there is any noncomparison between corresponding points in the two systems a "1" appears at lead M from the output of gate 13, indicating a mismatch.

A frequency of mismatch determining unit 14 and an extended mismatch determining unit 15 are connected having inputs from lead M. Whenever a "1" occurs on lead M indicating a mismatch, a counter in unit 14 is incremented, and a timer in unit 15 is started. There is also a timer in the unit 14 which is actuated whenever the counter is off of the "0" count. The unit 14 is reset whenever the full count is not reached in the time period provided by the timer; and the extended mismatch determining unit 15 is reset whenever the signal on lead M goes to "0" indicating the end of a particular mismatch. If the unit 14 reached the full count before the given time period a signal appears on lead HFM indicating a high frequency of occurrence of mismatches. If the extended mismatch determining unit reaches the full given time interval while a single mismatch continues a signal on EM is produced indicating a long duration mismatch. A signal on either lead HFM or EM via OR gate 16 produces a signal RT to enable the test control unit 17 to request and monitor tests of subsystem 11A or 11B. The test control unit also may produce a signal on lead TR to request subsystem transfer by actuating the transfer switching apparatus 18.

Figure 2:
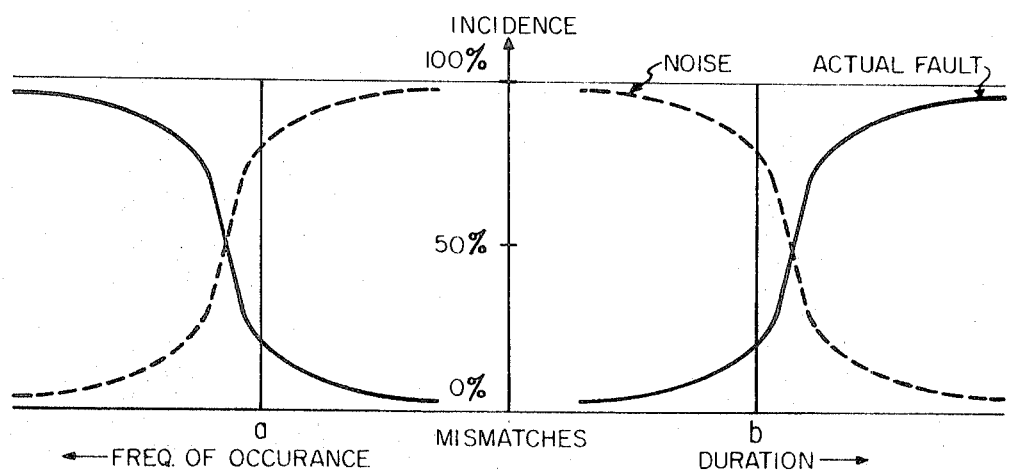
FIG. 2 is a graph illustrating the principle of the invention.

FIG. 2 illustrates the relative characteristic of noise- and fault-produced mismatches. The right-hand portion of the abscissa of this graph shows mismatches of increasing duration to the right and mismatches of increasing frequency of occurrence to the left. The graph illustrates that the mismatches caused by noise are "midband," that is, they are of low frequency of occurrence and short duration. In order to reduce the response of the test control unit to noise-produced mismatches, it is necessary to attenuate the "midband" while the extremities of the "frequency of occurrence —duration" spectrum should remain nonattenuated.

Figure 3:
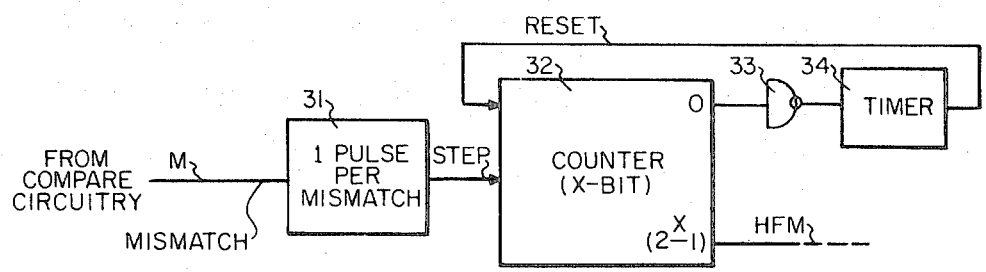
FIG. 3 is a functional block diagram of one form of a frequency mismatch determining unit.

Mismatches which appear and disappear at a high rate of occurrence, namely those to the left of point $a$ in the graph of FIG. 2, may be detected by a counter and timer as illustrated in FIG. 3. Each appearance of a mismatch causes a device 31 to produce one pulse to step the counter 32 by one count. As soon as the first mismatch is detected and counted, the timer 34 begins in response to the output via inverter 33 from the decoded 0 output of the counter 32. The counter may, for example, comprise a number of bistable devices arranged to count in a binary manner, so that with $x$ devices the full count is a value of ($2^x-1$). If the counter does not accumulate a full count before the time times out, the time out signal will reset the counter, and the circuit awaits the next mismatch. Thus, mismatches with a low frequency of occurrence, namely, those to the right of point $a$ in FIG. 2, will not be recognized as caused by a possible fault. However, if the frequency of occurrence is high, the full count will be reached before the timer times out and the full count will be decoded as a signal on lead HFM that a possible fault has occurred. Therefore, high mismatch rates will be detected, namely those to the left of $a$ in FIG. 2.

The threshold of the mismatch rate detecting unit may be set by selecting the modulus of the counter 32 and/or varying the period of the timer 34. The relative position of point $a$ in FIG. 2 may then be shifted as required in a particular situation.

Mismatches may be timed for duration to establish point $b$ in FIG. 2 in several ways.

Figure 4:
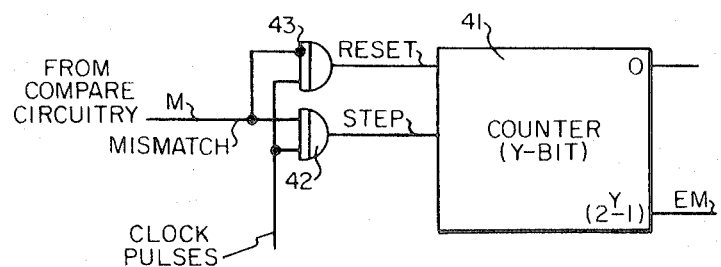
FIGS. 4 and 5 are functional block diagrams of alternative embodiments of the extended mismatch determining unit.

A first arrangement is illustrated in FIG. 4, which comprises a counter 41 into which clock pulses are gated. When a mismatch occurs on lead M, the clock pulses are gated via AND-gate 42 so that each clock pulse advances the counter by one step. The counter may, for example, comprise Y bistable devices in a binary arrangement in which case the value of a full count is ($2^y-1$). If the mismatch remains for a sufficiently long time, the counter will reach the full count and will produce a signal on lead EM if a mismatch of extended duration has occurred, indicating a possible fault. Whenever a mismatch disappears before or after a full count, the counter is reset via the inverted mismatch signal at gate 43 passing clock pulses to the reset input of the counter. The counter will thus time for mismatches which occur for a duration of time equal to or greater than ($2^y-1$)·T, where Y is the number of bits in the counter, and T is the clock period (interval between successive clock pulses).

A difficulty with the embodiment of FIG. 4 is that it might be desirable to time for a duration of up to several hundred clock periods, which might require excessive amounts of hardware in the counter. Also changing the threshold point (duration) might be troublesome.

The timer 15 of FIG. 1 might also be based on analog circuitry. However, if the system is based on using standard circuit modules this would be a special circuit requiring an additional type of module.

Figure 5:
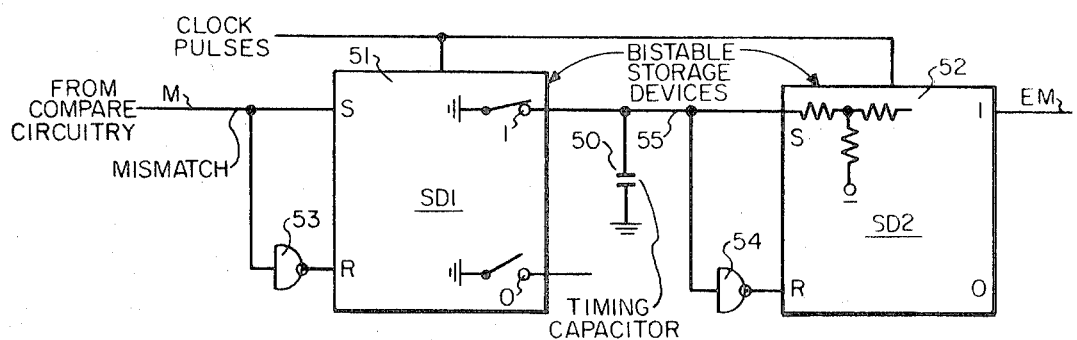

A practical alternative embodiment for timing the duration of a mismatch is shown in FIG. 5. In this embodiment a capacitor 50 charges through the resistive elements of associated logic devices to perform the timing function. For example, an input storage device SD1 may be set in response to the signal on lead M whenever a mismatch occurs, and be reset from another signal on the same lead via an inverter 53 when the mismatch ends. The storage device may be any bistable logic device such as a flip-flop or latch. A latch may comprise two NOR gates with the output of each connected to an input of the other, with other inputs of the NOR gates being used to set and reset the latch. It may be assumed that the storage device has outputs such that when it is in the reset condition the "1" output is connected via a path of negligible impedance to ground and a circuit of high impedance appears at the "0" output; and the condition of the outputs is reversed when the device is in the set condition. FIG. 5 shows another storage device SD2 at the output of the circuit. A conductor 55 connects the "1" output of storage device SD 1 to the set input of storage device SD2, and via inverter 54 to the reset input thereof. The timing capacitor 50 is also connected between conductor 55 and ground. The storage devices and other logic elements connected to conductor 55 will have bias resistors to bias- voltage sources which will provide a particular charging time constant for the capacitor 50. Whenever the storage device SD1 is in the reset condition the ground from the "1" output to conductor 55 short circuits the capacitor to thereby effectively reset the timing.

Usually in FIG. 5 the input storage device SD1 is in the reset condition. The capacitor is not charged and remains at the "0" logic level potential; so that the storage device SD2 cannot be set. For example the storage device SD1 may have a transistor which is in the conducting state and shorts the capacitor to ground. When a mismatch appears on lead M, the device SD1 is set, the short is removed from the capacitor, and it begins to charge to logic level "1." If the mismatch remains for a sufficient length of time, the capacitor charges to a level at which the device SD2 will set and signal a mismatch of extended duration on lead EM. If the mismatch does not remain for a sufficient length of time, the device SD1 will reset before device SD2 sets and the charge drains from the capacitor 50 via the conducting output of device SD1. Therefore, the capacitor is returned to the "0" logic level and waits for the beginning of the next mismatch.

In the embodiment of FIG. 5, the timing is easily varied by changing the size of the capacitor 50. The timing period is obtained from the value of capacitance and the resistance networks of the logic devices.

SPECIFIC EMBODIMENT USED IN A TELEPHONE SWITCHING SYSTEM

Figure 6:
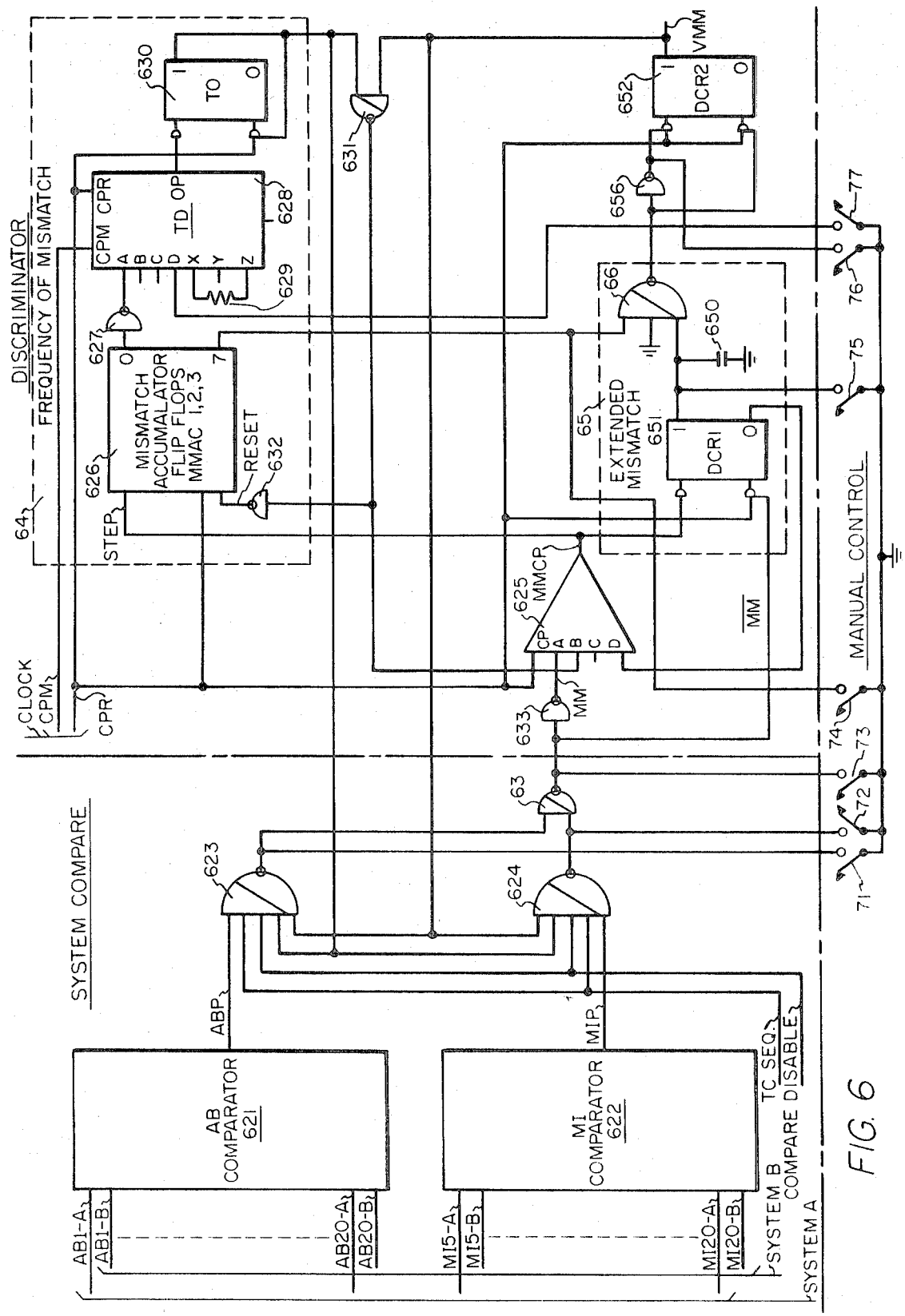
FIG. 6 is a functional block diagram of a particular embodiment of the invention.
Figure 7:
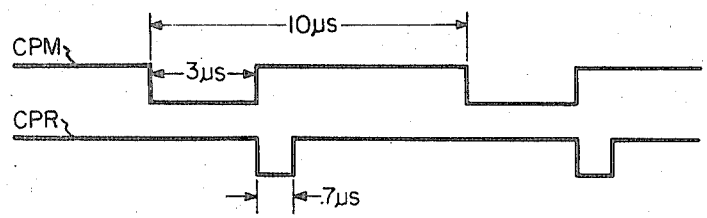
FIG. 7 is a graph of the clock pulses used in the embodiment of FIG. 6.

FIGS. 6-9 disclose an embodiment of the invention used in a small exchange stored program switching system designated commercially as the C1-EAX, a prototype of which is disclosed in U.S. Pat. No. 3,487,173 by R. W. Duthie et al. The apparatus is incorporated into the fault buffer FB shown in FIG. 1 of the patent. The logic modules such as gated pulse amplifier, flip-flops, and gates are generally similar to those shown in FIG. 5 of the Duthie et al. patent, or in FIG. 21 of U.S. Pat. No. 3,173,994 with some detail modifications. The comparator circuits may be of the type shown in U.S. Pat. No. 3,478,314 by W. R. Wedmore. The system includes a duplicated central processing unit. The system now includes several flip-flop stores including a memory input address register designated MI and two accumulators designated AA and AB. The system comparison circuitry includes comparators 621 and 622 shown in FIG. 6. The outputs of the 20 flip-flops of accumulator AB designated AB1-AB20 from system A and system B are compared by the comparator 621, so that whenever each flip-flop output of the one system is at the same logic level as the corresponding output of the other system of signal ABP is true. Similarly the comparator 622 compares the output of sixteen flip-flops MI5-MI20 of system A with those of system B and when they are respectively equal the signal MIP is true. The logic levels used in this system are a −8 volts for "1," and ground potential for "0." An open circuit is also used for the logic level "1," the output of a logic module generally being from the unbiased collector electrode of a transistor which is in the cutoff condition for the "1" state, and the negative biasing potential being supplied at the inputs of the succeeding logic modules. The clock pulses as now used in the system comprise trains of negative pulses, which are a train of pulses on the lead CPM of 3 microseconds duration recurring every 10 microseconds and a train of pulses on lead CPR of 0.7 microseconds, with the leading edge of the CPR pulses occurring in coincidence with the trailing edges of the CPM pulses as shown in FIG. 7.

As shown in FIG. 6, the discriminator for distinguishing between noise and fault mismatches comprises a frequency of mismatch determining unit 64, and extended mismatch determining unit 65, and related logic circuits.

Figure 8:
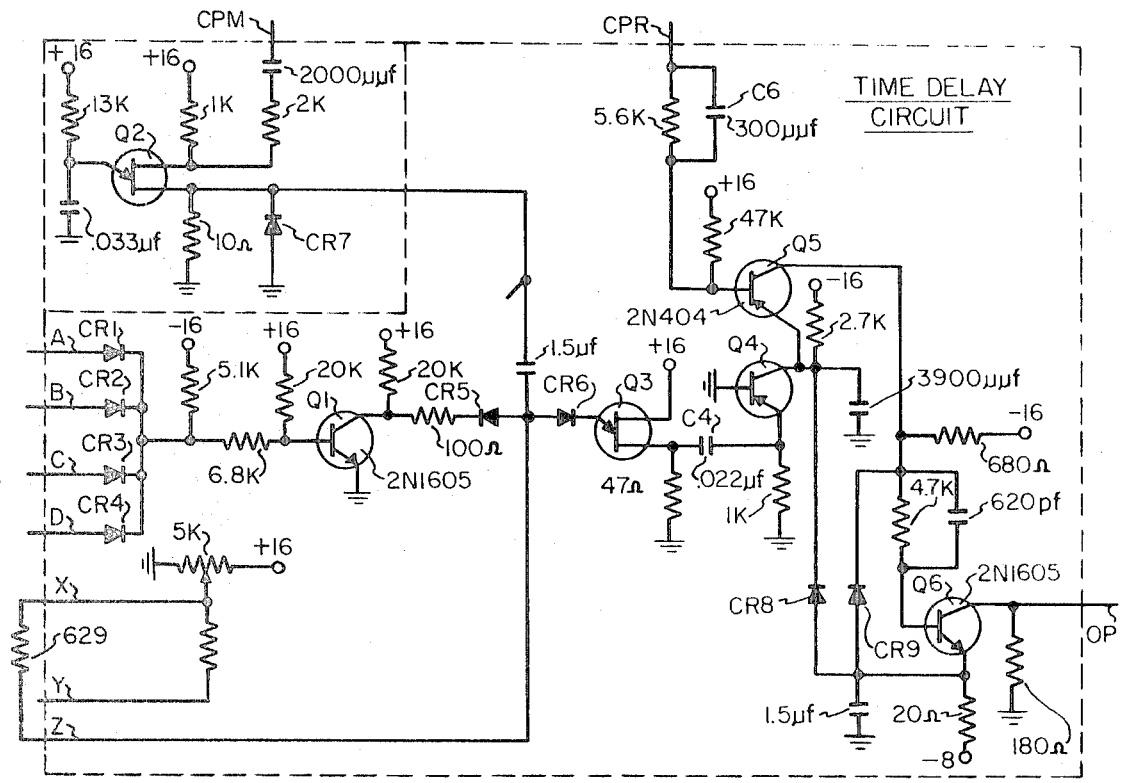
FIG. 8 is a schematic diagram of the time delay circuit used in the frequency of mismatch determining unit of FIG. 6.

The frequency of mismatch determining unit 64 comprises a counter 626 designated as the mismatch accumulator, comprising flip-flops MMAC1, MMAC2 and MMAC3; along with associated counting logic circuits. One combination of the states of the three flip-flops is designated the zero state of the counter which is decoded to provide the "0" output shown on the upper right-hand side. Each time a pulse is received on the lead marked "step " the accumulator is advanced by one count. The decoded output for the combination for the count of 7 produces an output at logic level "1" at an output indicated by a "7" at the lower right-hand side. A signal on the lead marked "reset " in coincidence with a pulse on lead CPR from the clock resets the accumulator to the zero state. The unit 64 also includes a time delay circuit 628, with a schematic diagram shown in FIG. 8. The circuit includes a diode AND gate at the inputs A, B, C and D arranged so that when all four of these leads are at logic level "1 " the timer is actuated, and a "0" level (ground potential) at any one of these inputs resets the circuit and maintains it at the initial condition. The time delay produced by the circuit is determined by an internal resistor connected by shunting the terminals Y and Z, or by an external resistor connected between the terminals X and Z. In unit 64 a 33,000-ohm resistor 629 provides a time delay of 50 milliseconds. The portion of the circuitry in the upper left-hand corner of FIG. 8 provides for synchronization by clock pulses on lead CPM; and this circuit may be connected in multiple to three time delay circuits on a single printed circuit card. When the circuit has been actuated for the full interval of the time delay, clock pulses on lead CPR are gated to the output lead OP. The clock pulse from the lead OP of the time delay circuit 628 is used to set a time out flip-flop TO. The output of this flip-flop enables its reset input so that it resets on the next pulse on lead CPR, and also via gates 631 and 632 resets the accumulator 626 with the pulse on lead CPR. With resistor 629 having a value of 33,000-ohms, the point $a$ in FIG. 2 is 7 mismatches per 50 milliseconds.

Figure 9:
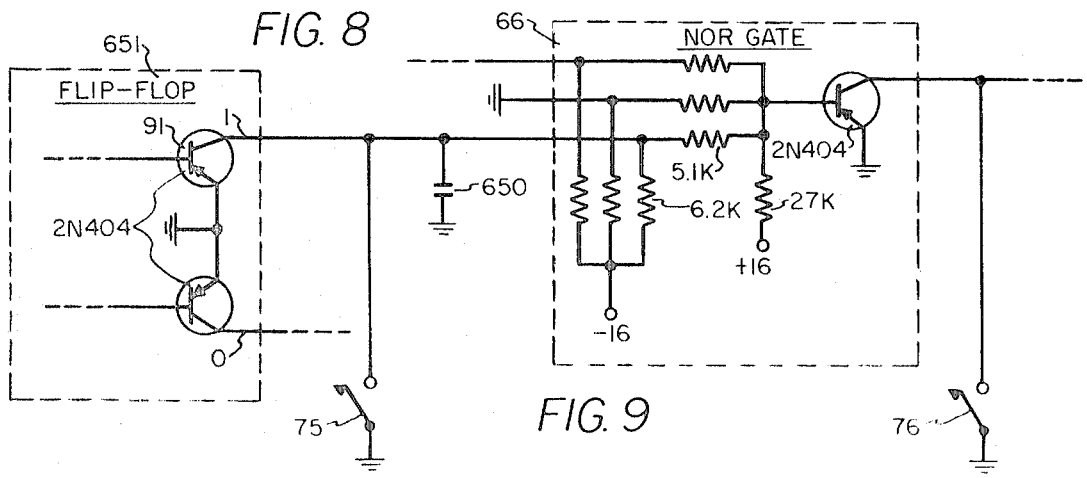
FIG. 9 is a schematic diagram of the extended mismatch determining unit of FIG. 6.

The extended-mismatch determining unit 65 comprises a timing capacitor 650 along with a flip-flop DCR1 or NOR gate 66; shown in more detail in FIG. 9. Normally the flip-flop DCR1 is in the reset condition in which the "1" output is at ground potential via the collector-emitter path of transistor 91 and the zero output is open to provide the logic level "1." The NOR gate 66 normally has all three of its inputs at the "0" logic level of ground potential. In the NOR gate each of the three inputs is connected via a 5,100-ohm resistor to the base electrode of the transistor and via a 6,200-ohm resistor to the negative 16-volt bias source. The base electrode is also connected via a 27,000-ohm resistor to the positive 16-volt bias source. Normally all three inputs are at the "0" logic level or ground potential and the transistor is biased to cut off, so that the output is at logic level "1." An open circuit (or a sufficiently high value of negative potential) at any one of the inputs will bias the transistor into saturation so that the ground potential is supplied via the emitter-collector path to the output to provide the "0" logic level. The capacitor 650 has a nominal value of 0.33 microfarads. It is wired directly to the pins of the circuit in such a manner that it may be removed and replaced by one of a different value without disturbing any other wiring. Note that all of the resistance in the associated circuit is part of the standard NOR gate module. The value of the capacitor is determined by the formula $c=0.04 (I-0.5)$ microfarads, where $I$ is the number of computer instructions over which a mismatch on lead MM must remain to set the flip-flop DCR2 indicating a valid mismatch. The value of 0.33 microfarads provides a value for I of approximately 8.75 instructions or an interval of approximately 340 microseconds. This is the value for $b$ in FIG. 2.

The outputs from the comparators 621 and 622 are taken through the gates 623 and 624 respectively and thence through gate 63 and inverter 633 to the lead MM to indicate a mismatch between system A and system B. Logically the combination of gates 63 and 633 provides an OR function so that a "1" at either input of gate 63 provides a "1" on lead MM. Normally both inputs of gate 63 are at level "0" so that the signal on lead MM is also "0." Each of the gates 623 and 624 has a "0" output when any one of the inputs is at "1." Normally with the two systems A and B running in synchronism and having the same information in their registers, the signals on leads ABP and MIP will both be "1." Normally the other four inputs of each of the gates 623 and 624 will be at the "0" level; therefore if the signal on lead ABP goes to " 0" because of a noncomparison of the information in the AB accumulator of the two systems, the output of gate 623 will become a "1," and in like manner if the signal on lead MIP becomes a "0" because of a noncomparison of the information in the MI registers of the two systems the output of gate 624 become a "1." In either case the signal via gates 63 and 633 produces a "1" on lead MM indicating a mismatch. This provides a signal to the input A of the gated pulse amplifier 625.

The logic of the gated pulse amplifier is such that a direct-coupled AND function is provided via the inputs A, B, C and D so that when all of the inputs are at the "1" level the next clock pulse appearing at the input CP is gated through to the output on lead MMCP. Normally the signals at inputs B, C, and D are at the "1" level so that when the signal level "1" appears on lead MM the next pulse from CPR is passed to the lead MMCP, which provides an input to both the frequency of mismatch determining unit 64 and the extended mismatch determining unit 65. The mismatch accumulator 626 is advanced one step, and the flip-flop DCR is set. With flip-flop DCR1 set its zero output goes to logic level "0" and inhibits the gated pulse amplifier 625 via input D. As long as a mismatch continues flip-flop DCR1 remains set and the gated pulse amplifier 625 continues to be inhibited. When the mismatch condition disappears the signal from gate 63 on lead $\overline{MM}$ becomes a "1" so that the next pulse on lead CPR resets the flip-flop. Thus with mismatch signals of short duration, the flip-flop DCR1 sets and resets, and the mismatch accumulator 626 continues to step in response to each mismatch. When the counter of the mismatch accumulator 626 steps from its zero position the output of inverter 627 becomes logic level "1" and actuates the time delay circuit 628. If the mismatches are infrequent the time delay circuit will remain actuated for a predetermined interval (approximately 50 milliseconds), and then a clock pulse from lead CPR is gated through the output OP to set the time out flip-flop TO. This signal provides a "1" at the inputs of gates 623 and 624 so that their outputs are continuously at "0" regardless of the noncomparison between the two systems. The time out signal via gate 631 also supplies a "0" at input B of the gated pulse amplifier 625 to inhibit it; and via inverter 632 supplies a signal to reset the accumulator 626 upon the next occurrence of a clock pulse on lead CPR. The flip-flop TO is also reset on the next pulse on lead CPR.

Thus, if the mismatches are at a low frequency of occurrence the accumulator 626 will reset before the count of seven is reached; and if the mismatches are of short duration the flip-flop DCR1 is reset to discharge the capacitor 650 at the end of each mismatch. However, if the accumulator 626 reaches a count of seven before the time delay circuit 628 causes the time out flip-flop TO set; or if the mismatch is of extended duration so that the capacitor 650 becomes charged to a sufficient level, a "1" will appear at the output of inverter 656, since the gate 66 and inverter 656 together comprise on OR logic function. This signal from the inverter 656 primes the AC set input coincidence gate of flip-flop DCR2 so that it is set upon the next clock pulse on lead CPR. The signal on lead VMM is then true to indicate a valid mismatch. This signal is supplied to test control apparatus to initiate a test call. The signal on lead VMM also supplies a "1" to gates 623 and 624 to maintain their outputs at "0 ", via gate 631 inhibits the gated pulse amplifier 625 at input B, and via inverter 632 causes the accumulator 626 to be reset by the next clock pulse on lead CPR. When all of the inputs of gate 66 return to "0" the output thereof primes the reset coincidence gate of the flip-flop DCR2 so that it is reset by the next clock pulse on lead CPR.

Manual controls comprising switches 71-77 are provided for use by a maintenance man. The switches 71 and 72 provide ground at the outputs of the gates 623 and 624 respectively to thereby disable them from responding to a noncomparison signal at their inputs. Switch 73 grounds the output of gate 63 to thereby via inverter 633 maintain a mismatch signal at level "1" on lead MM. The switch 74 provides a signal at the input of the three input NOR gate 66 to inhibit the mismatch count signal. The switch 75 maintains the output from flip-flop DCR1 at ground potential to thereby disable the extended mismatch determination. The switch 76 grounds the output of gate 656 which inhibits DCR2 from setting to disable the valid mismatch. The switch 77 maintains ground on input D of the time delay circuit 628 to prevent it from being actuated. The outputs of the various flip-flops are connected to control various display lamps not shown. The manual control switches and display lamps are provided to facilitate manual testing.

What is claimed is:

1. In combination,
   comparison means connected to compare logic signal conditions at corresponding points of two subsystems and to produce a given signal condition on a mismatch conductor at an output of the comparison means responsive to a noncomparison at any corresponding points of the two subsystems;
   "frequency-of-mismatch" means comprising a counter and a first timer, means responsive to each occurrence of said given signal condition on the mismatch conductor to advance the counter, means responsive to a nonzero output from the counter to actuate the first timer, means responsive to the first timer being continuously actuated for a first time interval to reset the counter to zero, and means responsive to the counter reaching a given count while the first timer is actuated for less than the first time interval to produce a signal on a "high-frequency-of-mismatch" output conductor;
   "extended-mismatch" means comprising a second timer, means responsive to said given signal condition on the mismatch conductor to actuate the second timer, means responsive to absence of the given signal condition on the mismatch conductor to reset the second timer, and means responsive to the second timer being continuously actuated for a second time interval to produce a signal on an "extended-mismatch" output conductor;
   and OR gating means having the "high-frequency-of-mismatch" and "extended-mismatch" conductors connected to inputs thereof, so that a signal appearing at an output thereof responsive to a signal on either of the inputs indicates a probable fault in one of said subsystems.

2. The combination as claimed in claim 1, wherein said second timer comprises a capacitor connected to a timer conductor between digital logic devices containing resistive biasing circuit means, with the logic devices including means coupled to the mismatch conductor and to the timer conductor to cause the capacitor to charge via said resistive means responsive to said given signal condition on the mismatch conductor, and to cause the capacitor to be short circuit shunted responsive to the absence of the given signal condition.

3. The combination as claimed in claim 2, wherein said logic devices include an input bistable device coupled between the mismatch conductor and the capacitor;
   the bistable device having a "set" state and the a "reset" state, with means to actuate it to the "set" state responsive to the given signal condition and to actuate it to the "reset" state responsive to absence of the given signal condition on the mismatch conductor;
   and the short circuit shunt path for the capacitor being via switching means within the first bistable device.

4. The combination as claimed in claim 3, wherein said logic devices further include an output bistable device having input means coupled to said timing conductor, so that it is actuated to a "set" state responsive to said second time being actuated for said second time interval, and it is actuated to a "reset" state responsive to the "reset" state of said input bistable device.

5. The combination as claimed in claim 3, wherein said logic devices include an output device having an input connected to said timer conductor, and wherein said resistive biasing circuit means includes biasing resistance means internal to the output device connected between the input and voltage source means; all of said logic devices being standard module types; and wherein said capacitor may be changed to change said second time interval.

6. The combination as claimed in claim 3, wherein said logic devices include a pulse gating device having a pulse input, direct-coupled control input means, and an output, for producing a pulse at its output responsive to enabling signals at the control input means and the occurrence of a pulse at the pulse input; with the pulse input connected to a source of recurring clock pulses, and the control input means coupled to said mismatch conductor so that responsive to said given signal condition on the mismatch conductor a pulse is produced at the output for each clock pulse at the pulse input; the output of the pulse gating device being coupled to both the counter of said "frequency-of-mismatch means" and said input bistable device of the "extended-mismatch" means; the counter being advanced responsive to each pulse and the input bistable device being actuated to its "set" state responsive to the pulses from the output of the pulse gating device.

7. The combination as claimed in claim 6, wherein said input bistable device has an input direct-coupled to an output conductor from said comparison means having an inverted form of the signal on the mismatch conductor, thereby providing said means to actuate to its "reset" state.

8. The combination as claimed in claim 7, wherein said input bistable device is a flip-flop having set and reset input means, each with a pulse input and a direct-coupled control input, each input means being enabled by either an open circuit or one logic condition at the direct-coupled control input to respond to a pulse at the pulse input; the set input means having the pulse input connected to the output of said pulse gating means with the direct-coupled input an open circuit, and the reset input means having the pulse input connected to the source of clock pulses and the direct-coupled input connected to said output conductor from the comparison means having an inverted form of the signal on the mismatch conductor.

9. The combination as claimed in claim 7, wherein said logic devices include an output gate device which comprises at least part of said OR gating means, the gate device having an input connected to said timer conductor, and wherein said resistive biasing circuit means includes resistance means internal to the gate device connected between the input and voltage source means.

10. The combination as claimed in claim 9, wherein said direct-coupled input control means of the pulse gating device comprises a plurality of inputs, one of which is connected to an output of said input bistable device to inhibit the pulse gating device when the input bistable device is in its "set" state.

11. The combination as claimed in claim 10, wherein said logic devices further include an output bistable device having input means coupled to an output of said OR gating means, with means to actuate the output bistable device to a "set" state responsive to a signal from the OR gating means produced by either the "high-frequency-of-mismatch" or "extended-mismatch" conductors and to actuate it to a "reset" state in the absence of said signal from the OR gating means; an output of the output bistable device being connected to a "-valid mismatch" conductor on which a signal condition indicates a probable fault.

12. The combination as claimed in claim 11, wherein said first timer includes a "time out" bistable device which is actuated to a "set" state responsive to the timer being actuated for said first time interval; wherein the first timer includes an external resistor which may be changed to change said first time interval; and wherein said capacitor may be changed to change said second time interval.

13. The combination as claimed in claim 12, further including OR gate means having inputs from said "time out" bistable device and from said "valid mismatch" conductor and an output connected to said counter to provide said means to reset the counter to 0 and an inverted output of the last said OR gate means being connected to an input of said direct-coupled input control means of the pulse gating device to inhibit it.

14. The combination as claimed in claim 13, further including manual switch control means connected to several of said conductors and logic devices to simulate or inhibit various conditions for testing the circuits.

15. The combination as claimed in claim 13, wherein all of said logic devices are standard module types.

16. The combination as claimed in claim 13, further including gate means between said comparison means and the mismatch conductor, having input connections from said "time out" bistable device and from said "valid mismatch" conductor to inhibit producing said given signal condition on the mismatch conductor.

17. The combination as claimed in claim 16, further including manual switch control means connected to the last said gate means to inhibit producing said given condition on the mismatch conductor.

18. The combination as claimed in claim 13, wherein said comparison means comprises a plurality of comparators, and gate means between each comparator and the mismatch conductor.

19. The combination as claimed in claim 18, further including manual switch means connected to the gate means following each comparator, to selectively inhibit each from producing said given signal condition on the mismatch conductor.

20. The combination as claimed in claim 19, wherein said gate means following the comparators have input connections from said "time out" bistable device and from said "valid mismatch" conductor to inhibit producing said given signal condition on the mismatch conductor.

* * * * *